US009062962B2

(12) United States Patent
Zebe et al.

(10) Patent No.: US 9,062,962 B2
(45) Date of Patent: Jun. 23, 2015

(54) LASER MEASUREMENT SYSTEM AND METHOD IN A CNC MACHINE

(71) Applicant: Flextronics AP, LLC, Broomfield, CO (US)

(72) Inventors: Gerhard Zebe, Zhuhai (CN); Zhuo Li, Shanghai (CN)

(73) Assignee: Flextronics AP, LLC, Broomfield, CO (US)

( * ) Notice: Subject to any disclaimer, the term of this patent is extended or adjusted under 35 U.S.C. 154(b) by 6 days.

(21) Appl. No.: 13/929,437

(22) Filed: Jun. 27, 2013

(65) Prior Publication Data

US 2014/0009766 A1 Jan. 9, 2014

Related U.S. Application Data (60) Provisional application No. 61/668,324, filed on Jul. 5, 2012, provisional application No. 61/798,836, filed on Mar. 15, 2013.

(51) Int. Cl.
| G01B 11/14 | (2006.01) |
| G01B 11/00 | (2006.01) |
| G05B 19/00 | (2006.01) |
| G01S 17/42 | (2006.01) |
| G01S 17/89 | (2006.01) |
| G01S 7/481 | (2006.01) |

(52) U.S. Cl.
CPC .............. G01B 11/002 (2013.01); G05B 19/00 (2013.01); G01S 17/42 (2013.01); G01S 17/89 (2013.01); G01S 7/4811 (2013.01)

(58) Field of Classification Search
USPC .......................................... 356/601, 608, 625
See application file for complete search history.

(56) References Cited

U.S. PATENT DOCUMENTS

| 6,392,754 | B1 * | 5/2002 | Pingel et al. ................... 356/603 |
| 7,019,843 | B2 * | 3/2006 | Hill ................................ 356/500 |
| 7,570,369 | B2 * | 8/2009 | Henrikson ..................... 356/601 |
| 7,912,673 | B2 * | 3/2011 | Hebert et al. ................. 702/153 |
| 8,140,295 | B2 * | 3/2012 | Hebert et al. ................. 702/153 |
| 8,284,240 | B2 * | 10/2012 | Saint-Pierre et al. ........... 348/47 |
| 2001/0035959 | A1 * | 11/2001 | Hill ................................ 356/500 |
| 2004/0174537 | A1 * | 9/2004 | Ferger ........................... 356/601 |
| 2012/0105866 | A1 * | 5/2012 | Pettersson et al. ............. 356/601 |
| 2012/0200860 | A1 * | 8/2012 | Gaspardo et al. ............. 356/601 |
| 2012/0281239 | A1 * | 11/2012 | White et al. ................... 356/601 |
| 2013/0063731 | A1 * | 3/2013 | Gaspardo et al. ............. 356/601 |

* cited by examiner

Primary Examiner — Roy M Punnoose
(74) Attorney, Agent, or Firm — Haverstock & Owens LLP (57) ABSTRACT

A system for and methods of performing lateral measurements of a work fixed to an XY translation stage of a CNC machine comprises coupling a range-detecting laser scanner to a tool mount of the CNC machine that is translatable along the X, Y, and Z axes. The work is surrounded by reflectors that are coupled to the XY translation stage, preferably parallel to the X and Y axes. The laser scanner is initially positioned at a predetermined coordinate, and its laser output is directed toward one of the reflectors. The distance from the laser scanner to the work is measured and is correlated with the laser scanner position to determine a coordinate of the work. The scanner is then incremented along one of the X and Y axes and another coordinate of the work is determined. The periphery of the work is similarly scanned, and the lateral measurements are determined therefrom.

17 Claims, 9 Drawing Sheets

Fig. 4B (along section A-A of Fig. 4A)

LASER MEASUREMENT SYSTEM AND METHOD IN A CNC MACHINE

RELATED APPLICATION(S)

This non-provisional patent application claims the benefit of priority under 35 U.S.C. §119(e) of the U.S. Provisional Patent Application No. 61/668,324, titled "LASER MEASUREMENT SYSTEM AND METHOD IN A CNC MACHINE," filed Jul. 5, 2012, and the U.S. Provisional Patent Application No. 61/798,836, titled "LASER MEASUREMENT SYSTEM AND METHOD IN A CNC MACHINE," filed Mar. 15, 2013, both of which are hereby incorporated by reference in their entireties.

FIELD OF THE INVENTION

The present invention relates to the field of computer-assisted manufacturing. More specifically, the present invention relates to systems for and methods of measuring a part to be processed using a laser range detector system integrated with a CNC machine.

BACKGROUND OF THE INVENTION

A CNC machine is a computer numerical controlled machine tool. The CNC machine is used to process a material or a part known as "the work." The CNC machine comprises a translation stage to which the work is fixed. The translation stage is translatable along an X-axis and a Y-axis. Typically, the X- and Y-axes define a substantially horizontal plane, but other translation orientations are possible. The CNC machine further comprises at least one tool mount that is independent of the translation stage to which the work is fixed. The tool mount is translatable along the X, Y, and Z axes and can be translated in conjunction with, or independent from, the translation stage.

Before the work can be processed by the CNC machine, a detailed lateral measurement of the work must be made and entered into the CNC machine. In the prior art, measurement is performed using a mechanical gauge. The measurement typically comprises about 100 data points and takes almost one minute. By comparison, the actual processing of the work, after the measurement, takes only about 15 seconds. If the CNC machine translation stage does not comprise a mounting system that inherently squares up the work to the translation stage, it is desirable to account for skew in the mounting of the work with respect to the coordinate system of the CNC machine so that the work is accurately processed. Manually accounting for skew in the mounting of the work to the translation stage takes additional time in measurement and entry of skew data into the CNC machine.

Current methods of performing a lateral measurement of the work are slow, yield a small number of data points, and are not easily integrated into the CNC machine.

SUMMARY OF THE INVENTION

To ensure that a work is processed correctly, its dimensions must be accurately measured. Among other things, these measured dimensions indicate whether the unprocessed work meets product specifications and ensures that the work is machined at the correct locations. Preferably, the dimensions are measured optically, using a laser beam, though, in accordance with the principles of the invention, sonic or other measurement techniques can also be used.

In one embodiment, a time-of-flight laser scanner is coupled to an XYZ-translatable tool mount of a CNC machine. The work is fixed to an XY translation stage of the CNC machine. The work is surrounded by reflectors, such as mirrors or prisms, fixed to the XY translation stage. Alternatively, the laser scanner incorporates a reflector mounted at the output of the laser scanner. The CNC machine moves the tool mount, and thus the laser scanner, to a predetermined XYZ coordinate above the XY translation stage. A beam of the laser scanner is directed toward the XY translation stage at a predetermined angle with respect to the XY plane defined by the translation stage. Preferably, the beam is directed along the Z axis, perpendicular to the XY plane, such that the predetermined angle is 90° with respect to the XY plane. The beam is directed onto a reflector mounted along an edge of the work such that the beam is reflected by the reflector, onto the edge of the work, reflected back by the edge of the work, to the reflector, and to a detector within the laser scanner. Alternatively, the beam is reflected by a reflector coupled to the output of the laser scanner that directs the beam onto the edge of the work. The laser scanner measures the distance from the laser scanner to the edge of the work. The distance is correlated with the predetermined XYZ coordinate of the laser scanner to produce an XY coordinate of a point on an edge of the work. The laser scanner is then translated along an axis that is parallel to the reflector and more data points are collected. Each reflector is similarly scanned, thereby producing a lateral measurement of the work. In accordance with the presently-claimed invention, a complete scan is able to be performed in only a few seconds, producing over 1,000 data points, thereby increasing both the speed and accuracy of the lateral measurement of the work over the prior art.

The CNC machine comprises a control system having a processor, a computer-readable storage medium, read/write memory, a user interface, a network interface, other I/O, and auxiliary I/O. Auxiliary I/O comprises analog and digital inputs and outputs. The processor and/or the auxiliary I/O can further comprise a PWM generation module, interrupt controllers, a digital signal processing module, counters, and other I/O's known in the art of embedded systems design. The CNC machine control software comprises one or more programs that integrate the above-described measurement system with the CNC machine.

In a first aspect, a method of performing a lateral measurement of a work having a plurality of reflective edges is performed on a machine with the work in a fixed position relative to the machine and the machine comprising a laser scanner coupled to an XYZ translation stage, and the laser scanner initially positioned at a predetermined XYZ coordinate relative to the work. The method comprises positioning, by the XYZ translation stage, the laser scanner to a next XYZ coordinate (the first time this is done, the "next" XYZ coordinate are the initial XYZ coordinates), reading, by the laser scanner, a distance from the laser scanner to a point of reflection on a first reflective edge of the plurality of reflective edges of the work, using a beam emitted by the laser scanner, determining an XY coordinate of the point of reflection, and repeating these steps to determine XY coordinates of additional points on the reflective edges of the work until a complete lateral measurement of the work has been performed. Performing a lateral measurement preferably comprises determining an XY coordinate of a point of reflection at a plurality of points on each of the plurality of reflective edges. In one embodiment, a complete lateral measurement occurs when measurements at discrete distances along the entire periphery of the work (e.g., along each edge) have been taken. In a preferred embodiment, the work is substantially rectangular and the work is oriented substantially in alignment with the XY plane of the XYZ translation stage such that repositioning the laser scanner comprises incrementing the position of the laser scanner along one of the X and Y axes. The method preferably also comprises storing the XY coordinate. When no reflection is received in response to the beam emitted by the laser scanner, an invalid coordinate is stored. In a preferred embodiment, the method further comprises determining an identifier for the work. Preferably the identifier for the work is scanned using the laser scanner. From the identifier, a predetermined set of ideal coordinates associated with the identifier can be retrieved. The method preferably further comprises comparing the stored coordinates to the predetermined set of ideal coordinates. In such embodiments, the machine further comprises a notification system, and the method further comprises issuing a notification that one of: the stored coordinates substantially match and do not substantially match, the predetermined set of ideal coordinates.

In a second aspect, a system for performing a lateral measurement of a work having a plurality of reflective edges, comprises an XYZ translation stage, a laser scanner coupled to the XYZ translation stage, a platen configured to receive the work in a fixed position relative to the XYZ translation stage, and a controller. The controller is configured to position the XYZ translation stage at a predetermined next XYZ coordinate relative to the work, control the laser scanner to read the distance to a point of reflection on a first reflective edge of the plurality of reflective edges of the work, using a beam emitted by the laser scanner, determine an XY coordinate of the point of reflection, and repeat these steps to determine XY coordinates for additional points on the reflective edges of the work until a complete lateral measurement of the work has been performed. In some embodiments, the platen comprises a plurality of reflectors configured to reflect the beam onto a point on each of the plurality of reflective edges of the work. Preferably the work is substantially rectangular and the reflectors are disposed parallel to the reflective edges of the work. In a preferred embodiment, the laser scanner comprises a reflector configured to reflect the beam onto a point on a reflective edge of the work. In such embodiments, the XYZ translation stage is configured to rotate the laser scanner on a Z axis, perpendicular to a top surface of the platen. In a preferred embodiment, the controller is configured to reposition the XYZ translation stage to a second predetermined XYZ coordinate that is on a line through the first predetermined XYZ coordinate and parallel to one of the plurality of the reflective edges. In some embodiments, the controller is configured to reposition the XYZ translate stage to a second predetermined XYZ coordinate that is on line defined by an axis of one of the plurality of reflectors.

In a third aspect, a non-transitory computer readable medium is programmed with processor-executable instructions that, when executed, perform any of the above methods.

BRIEF DESCRIPTION OF THE DRAWINGS

In the detailed description of the drawings that follows, the embodiments described are intended to illustrate features of the presently claimed invention. Similar labels refer to similar or identical elements.

DETAILED DESCRIPTION OF THE DRAWINGS

Figure 1:
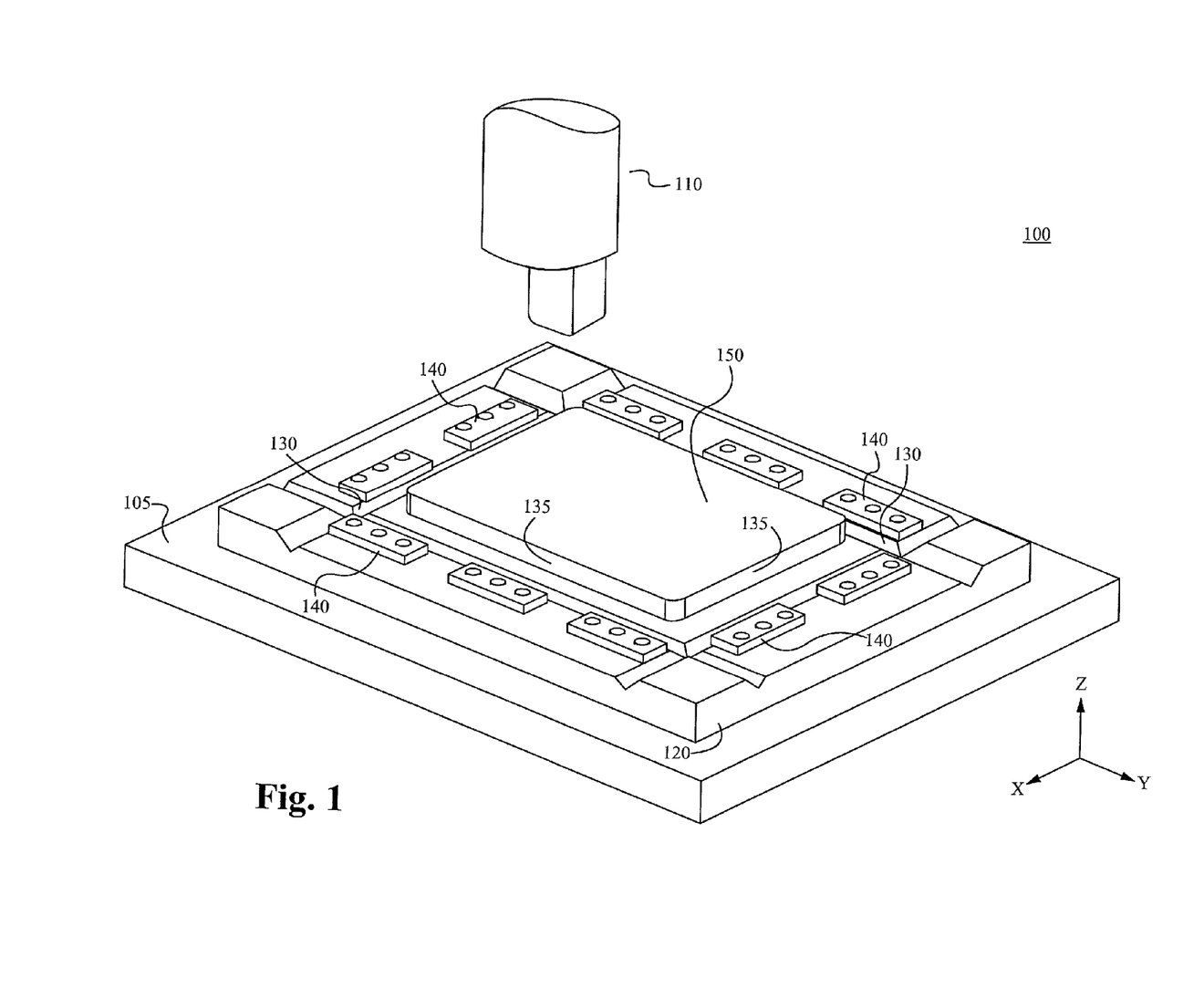
FIG. 1 is illustrates a system for laser measurement according to some embodiments.
Figure 7:
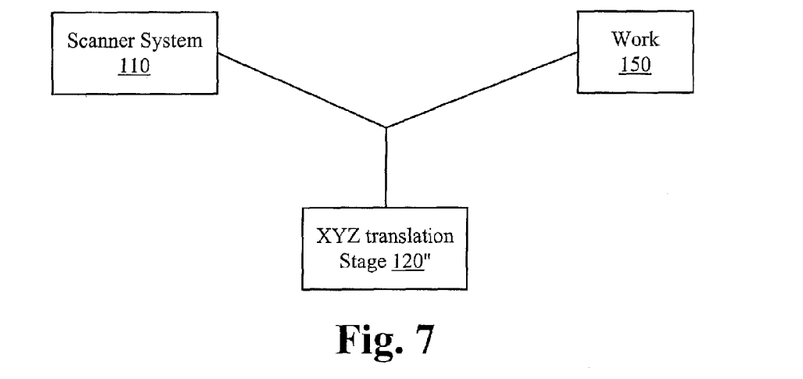
FIG. 7 is block diagram of a system according to some embodiments.

FIG. 1 is illustrates a system 100 for lateral measurement of a work according to some embodiments. The system 100 comprises a system support 105, a laser scanner system 110 having a detector 115 (shown in FIGS. 2A and 2B), an XY translation stage 120, a plurality of reflectors 130 retained by a plurality of retainers 140 and associated fasteners 145 (shown in FIGS. 2A and 2B), and a work 150 to be measured. The work 150 has a plurality of reflective edges 135. The work 150 is mounted to the XY translation stage 120 such that the work 150 can be translated in the XY directions in a plane defined by a top surface of the XY translation stage 120. The laser scanner system 110 is oriented such that a laser beam 160 (shown in FIGS. 2A and 2B) emitted from the laser scanner system 110 is substantially perpendicular to the plane of the work 150 and the XY translation stage 120. The laser beam 160 is directed toward a reflector 130 in the plurality of reflectors 130. The plurality of reflectors 130 are disposed around a periphery of the work 150 such that the laser beam 160 is reflected by the reflector 130 toward a reflective edge 135 of the work 150, then reflected back 165 (shown in FIGS. 2A and 2B) to the reflector 130 by the reflective edge 135, and then reflected to and received by the detector 115. The laser scanner system 110 measures the distance from the laser scanner system 110 to the work 150. The distance and the XYZ coordinate of the laser scanner are used to determine an XY coordinate of the point of reflection on the reflective edge 135 of the beam 160. The coordinate is stored. Then the laser scanner system 110 is translated parallel to one of the plurality of reflectors 130 and another measurement is taken and stored. One skilled in the art will recognize modifications within the spirit on the invention. As one example, the scanner system 110 is mounted to an XYZ translation stage and the work 150 could remain in a fixed position. FIG. 7 illustrates a block diagram of the scanner system 110, the XYZ translation stage 120" and the work 150 coupled together.

Figure 2A:
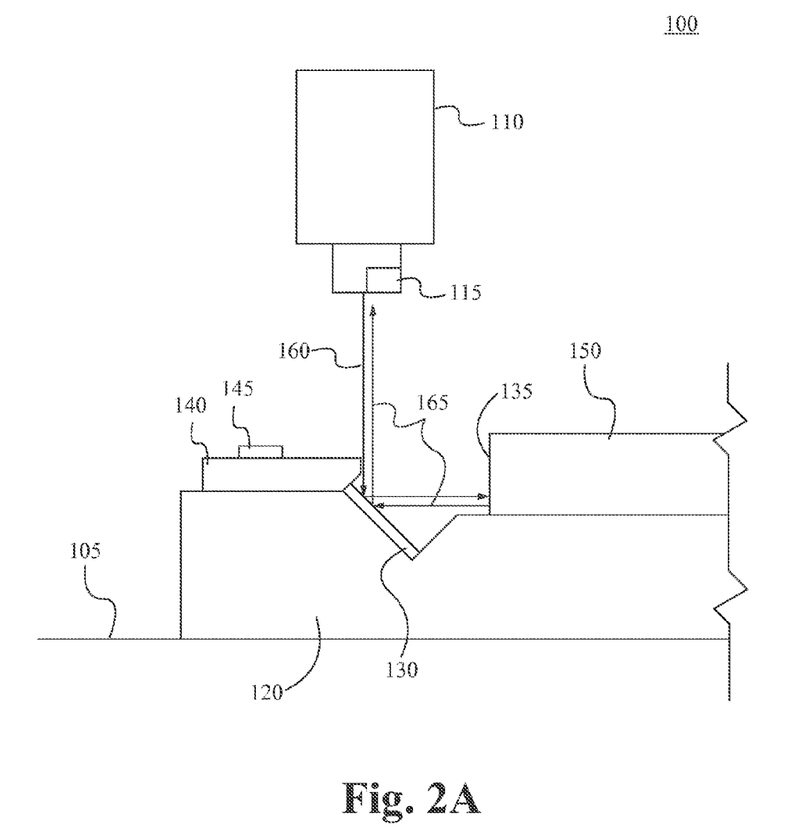
FIG. 2A illustrates a partial side cross-sectional view of a system for performing lateral measurement of a work according to some embodiments.

FIG. 2A illustrates a side cross-sectional view of a system 100 for performing a lateral measurement of a work 150. A CNC machine (not shown) comprises an XY translation stage 120, a laser scanner system 110 having a detector 115, and a reflector 130 retained to the XY translation stage 120 by a retainer 140 having a fastener 145. The laser scanner 110 is positioned at a predetermined Z coordinate by the CNC machine in relation to the XY translation stage 120. The predetermined Z coordinate will remain constant during the lateral measurement of the work 150. The laser scanner 110 emits a beam 160 that is reflected by the reflector 130 to the work 150. The beam 160 is reflected by a reflective edge 135 of the work 150, producing a reflected beam 165 that is, in turn, reflected by the reflector 130 up to the detector 115. The laser scanner system 110 computes the distance from the laser scanner 110 to the work, and back to the detector 115, by computing the "time-of-flight" of the beam 160 and reflected beam 165, reflected as described above. The round trip travel of the beams 160 and 165 is divided by two to obtain the single-direction beam travel distance from the laser scanner system 110 to the reflective edge 135 of the work 150. The single-direction travel distance of the beam 160 in the Z direction is subtracted from the total single-direction travel distance of the beam 160 to obtain the distance from the point of reflection on the reflector 130 to the work 150. The distance from the point of reflection on the reflector 130 to the work 150 is then added or subtracted from the coordinate of the point of reflection by the reflector 130 to obtain an XY coordinate of the point of reflection of the reflected beam 165 on the work 150. (FIG. 4 provides a detailed description of the coordinate computation.) The laser scanner 110 is translated incrementally, along an axis 180 (shown in FIG. 4) of the reflector 130, determining an additional coordinate of the work 150 at each increment. Each reflective edge 135 of the work 150 is similarly scanned, thereby generating a complete set of coordinates of the work 150. The beam 160, emitted from the laser scanner system 110, is shown as being offset from the reflected beam 165 for illustration purposes only. In practice, one skilled in the art will recognize that the beams 160 and 165 are substantially coincident. Although the invention has been described in terms of a laser scanner, one skilled in the art will recognize that a sonic scanner could also be used. However, the laser scanner is preferred for its high accuracy.

Figure 2B:
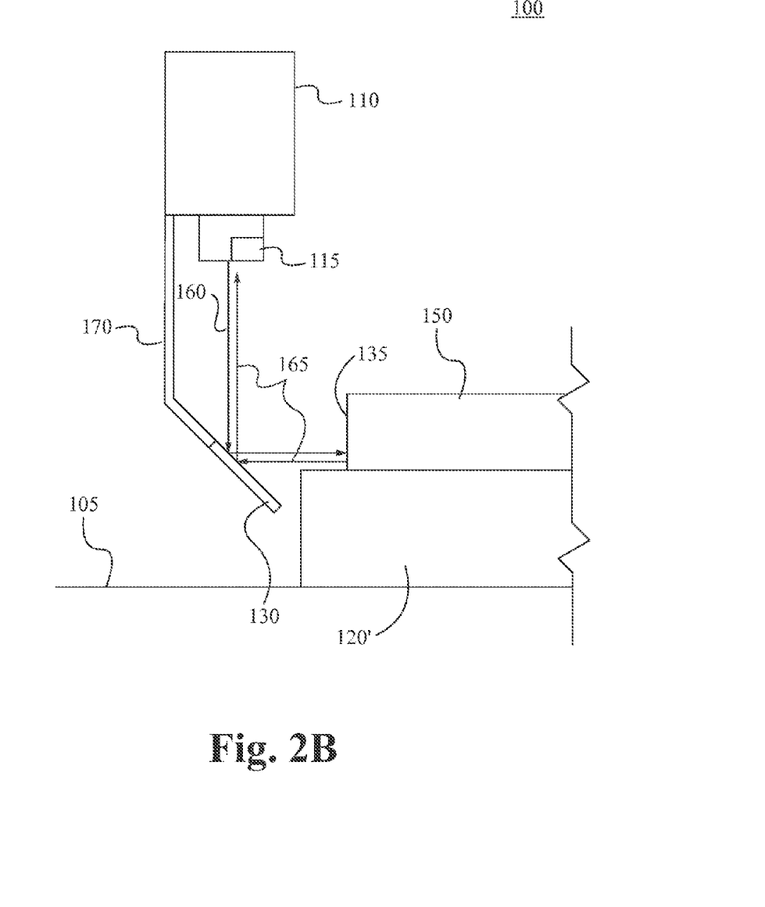
FIG. 2B illustrates a partial side cross-sectional view of a system for performing lateral measurement of a work according to some embodiments.

FIG. 2B illustrates a side cross-sectional view of a system 100 for performing lateral measurement of a work on a CNC machine according to some embodiments. In this embodiment, a single reflector 130 is mechanically coupled to the laser scanner system 110 by a reflector arm 170. The reflector 130 is mounted at a predetermined fixed distance from the laser scanner system 110. The laser scanner system 110 is mounted to an XY translation stage (not shown) and a fixed mount 120' replaces the XY translation stage 120 of FIG. 2A. A reflective edge 135 of the work 150 is scanned along a line parallel to the reflective edge 135, analogous to scanning along the centerline of the reflectors 130 as shown in FIGS. 1 and 2A. Then, the laser scanning system is rotated 90°, in this instance clockwise along the Z axis, and a next reflective edge 135 of the work 150 is similarly scanned. Each of the two remaining reflective edges 135 of a rectangular work 150 are similarly scanned to obtain the coordinates of the work 150, as described in FIGS. 1 and 2A above.

Figure 3A:
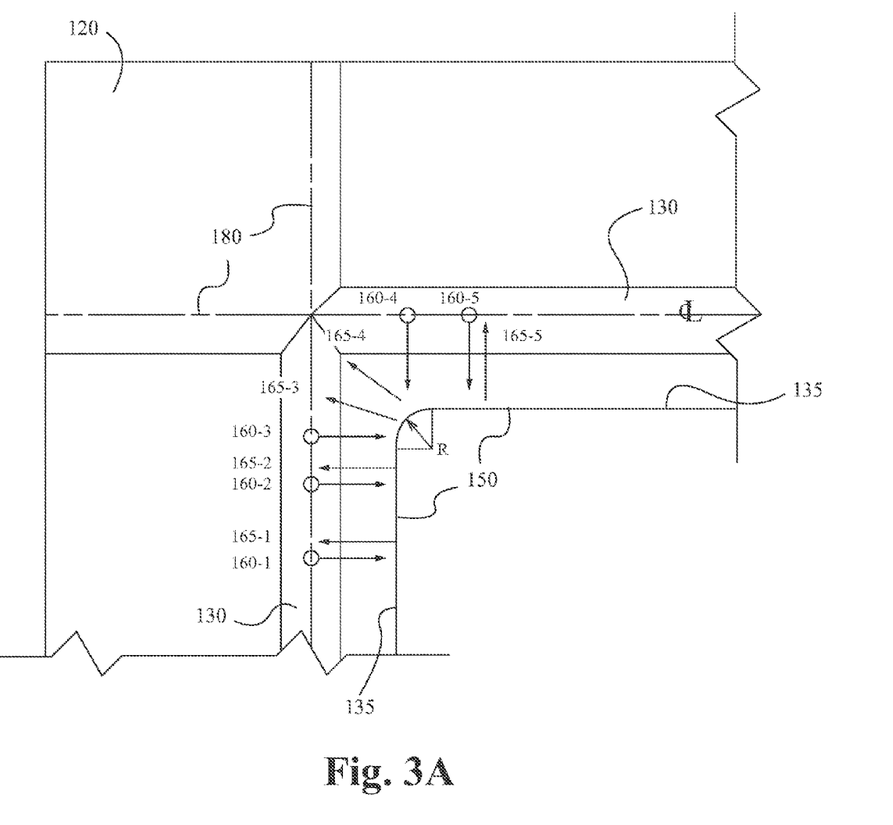
FIG. 3A illustrates lateral measurement of a work having a rounded corner according to system embodiments.

FIG. 3A illustrates lateral measurement of a work 150 having a rounded corner with a radius, R. FIG. 3A illustrates a partial plan view of the lateral measurement system. Retainers 140 and fasteners 145 are omitted for clarity. The lateral measurement system 100 shown comprises a plurality of reflectors 130 fixed around the periphery of the work 150. In this embodiment of the lateral measurement system 100, the reflectors 130 reflect a beam 160 toward a reflective edge 135 of the work 150, that in turn reflects back the beam 160 to generate a reflected beam 165 that is detected by the detector 115 incorporated into the laser scanning system 110. The beams 160-1 through 160-5 are emitted downward from the laser scanner 110. The point at which a beam, e.g. 160-1, impinges on a reflector 130 is shown by the open circle at the end of the arrowed line that indicates the beam direction. If a work 150 has a rounded, or otherwise non-orthogonal, reflective edge 135, then the reflected beam 165 will not be detected by the detector 115. A plurality of beams 160-1 through 160-5 and reflected beams 165-1 through 165-5 are shown. First and second reflected beams 165-1 and 165-2 are reflected parallel to their respective incident beams 160-1 and 160-2. The beams 165-1 and 165-2 will be detected and measured by the detector 115. Third and fourth beams 160-3 and 160-4 impinge upon the reflective edge 135 at a curved portion of the reflective edge 135. Accordingly, the reflected beams 165-3 and 165-4 are not detected by the detector 115. Beam 160-5 is reflected back 165-5 to the detector 115 because the beam 160-5 impinges upon the work 150 at a reflective edge 135 of the work 150 that is orthogonal to the beam 160-5.

Figure 3B:
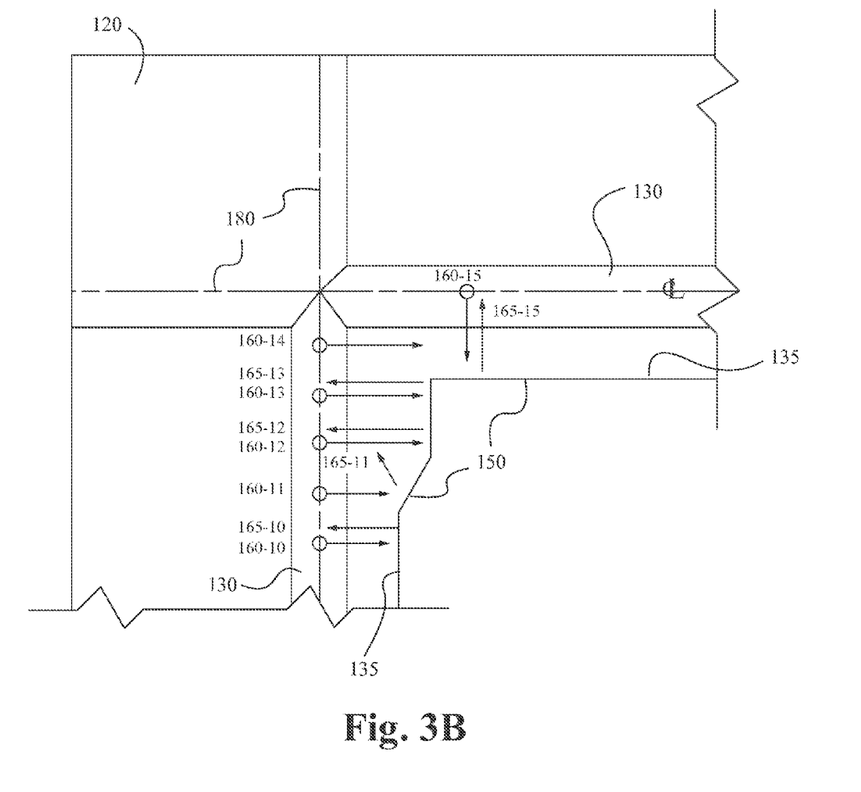
FIG. 3B illustrates lateral measurement of a work having an offset according to some embodiments.

FIG. 3B illustrates lateral measurement of a work 150 having an offset according to some embodiments. This view illustrates a partial plan view of the lateral measurement system 100. Retainers 140 and fasteners 145 are omitted for clarity. The lateral measurement system 100 shown comprises a plurality of reflectors 130 fixed around the periphery of the work 150. Like the embodiment in FIG. 3A, a beam 160 is reflected by a reflector 130 toward a reflective edge 135 of the work 150. The reflected edge 135 reflects the beam 160 back to the reflector 130 as reflected beam 165 that is detected by the detector 115 incorporated into the laser scanning system 110. If a work 150 has an offset in the reflected edge 135 or an otherwise non-orthogonal edge, then the reflected beam 165 will not be detected by the detector 115. A plurality of beams 160-10 through 160-15 and reflected beams 165-10 through 165-15 are shown. A first reflected beam 165-10 is reflected parallel to the incident beam 160-10. The reflected beam 165-10 will be detected and measured by the detector 115. A second beam 160-11 impinges upon the reflective edge 135 at an offset portion of the edge of the work 150. Accordingly, the reflected beam 165-11 will not be detected by the detector 115. The beams 160-12 through 160-15 are reflected back to the detector 115 as reflected beams 165-12 through 165-15 because the beams 160-12 through 160-15 impinge upon a portion of the reflective edge 135 that is orthogonal to the beams 160-12 through 160-15.

Figure 4A:
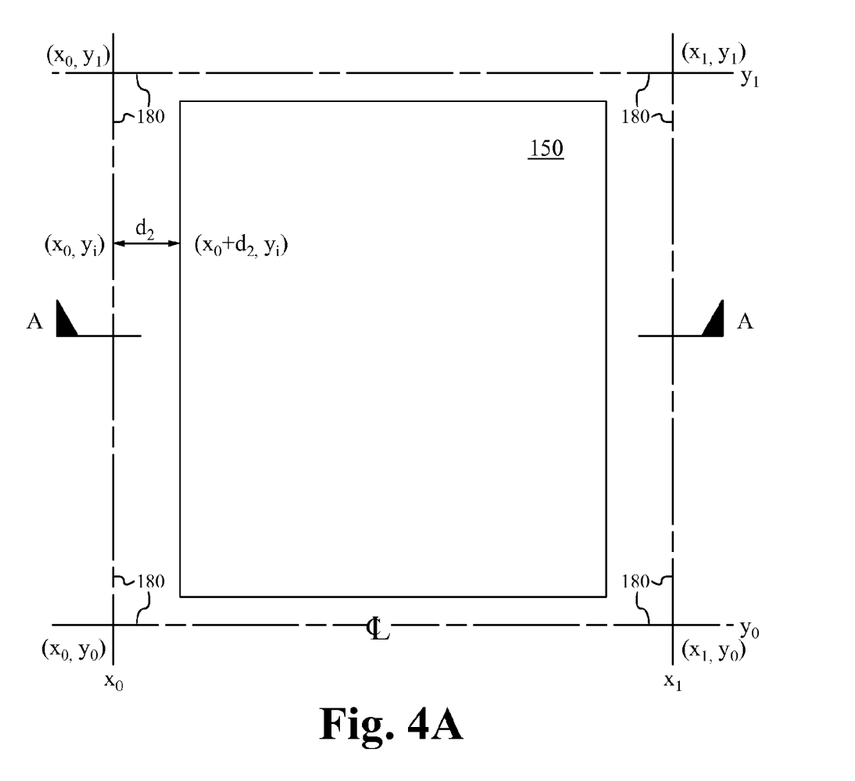
FIG. 4A illustrates a measurement grid for performing a lateral measurement of a work according to some embodiments.
Figure 4B:
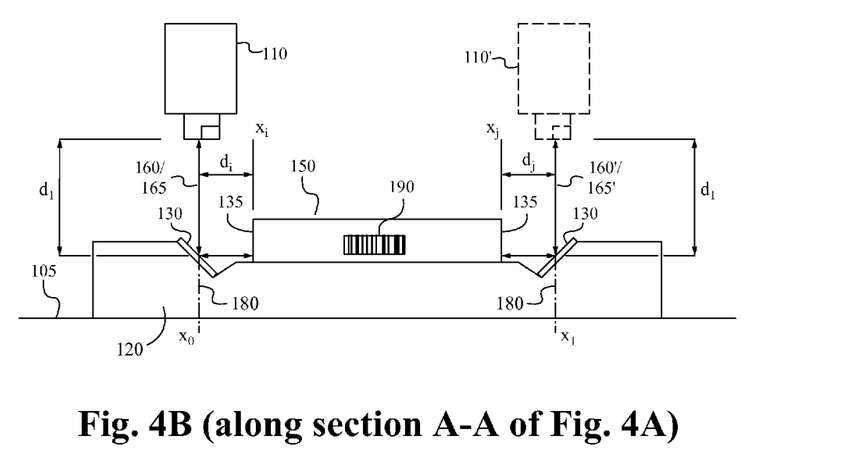
FIG. 4B illustrates a side cross-sectional view of the measurement grid of FIG. 4A.

FIG. 4A illustrates a measurement grid for performing a lateral measurement of a work 150. Elements 180 represent the centerline of a path of the scan of a reflective edge 135 of the work 150. In embodiments wherein a plurality of reflectors 130 are fixed to the XY translation stage 120, the elements 180 represent an axis of the reflectors 130 and a scan path for the laser scanning system 110. In embodiments wherein the laser scanner system 100 comprises a reflector 130, the elements 180 represent the scan path of the laser system 110. The elements 180 are super-imposed upon an arbitrary XY coordinate space through which the XY translation stage 120 moves the work 150, or through which the laser scanner system 110 is translated in embodiments wherein the work 150 remains stationary and the laser scanner system 110 is translated. FIG. 4B is a side cross-sectional view of the grid of FIG. 4A taken across the line A-A, used to further illustrate elements of the system 100. The elements 180 intersect at four arbitrarily named points: $(X_0,Y_0)$, $(X_0, Y_1)$, $(X_0Y_1)$ and $(X_1, Y_0)$. The steps for performing a scan are described in FIG. 5, below. FIGS. 4A and 4B illustrate the computation principles for determining the coordinates of the work 150. As shown in FIG. 4B, the laser scanning system 110 is positioned above an arbitrary scanning point, $(X_0,Y_i)$ at a height of $d_1$. A measurement is taken by directing the laser beam 160 at the point $(X_0,Y_i)$ on the reflector 130. The laser scanning system 110 measures the round trip of the emitted beam 160 and its reflection 165 (shown as 160/165), divides by two to get one direction of the trip, subtracts $d_1$, and obtains $d_j$. The coordinates of the work at the measured point are $(X_0+d_i, Y_j)$. The laser scanning system 110 is incremented in the Y direction (perpendicular to the plane of the page) with the X coordinate remaining constant at $X_0$. At each increment, the distance to the reflective edge 135 of the work 150 is measured and a coordinate of the work 150 is determined. At a second location, $(X_1, Y_j)$, another measurement is taken by the laser scanning system shown dashed as 110'. The round trip distance of the emitted beam 160' and the reflected beam 165' (shown as 160'/165') is computed and divided by two to get one direction of the trip, $d_1$ is subtracted, and $d_j$ is obtained. The coordinates of the work 150 at the measured point are thus $(X_1-d_j, Y_j)$. FIG. 4B also illustrates a Part ID area 190 that identifies the type of part being measured. The Part ID can be passed to the CNC machine to retrieve CNC information for the particular type of part having that Part ID. FIG. 6 shows the steps of a method 600 to scan the Part ID area 190.

Figure 5:
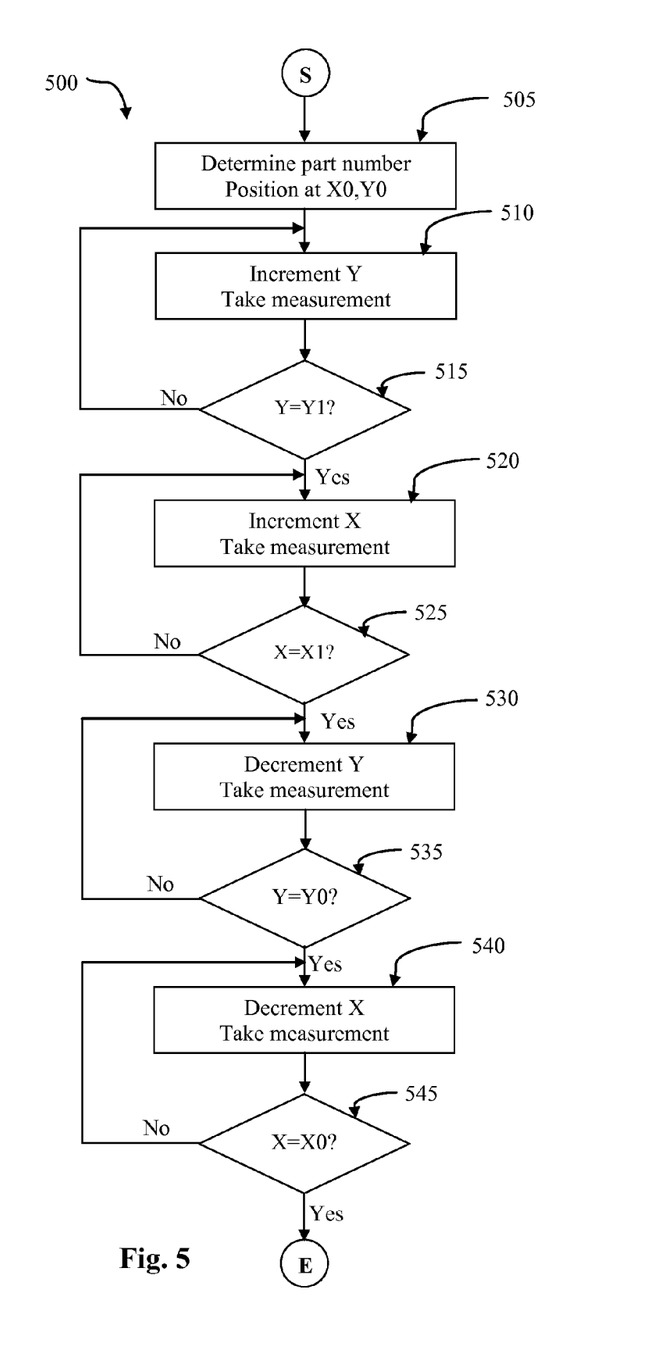
FIG. 5 illustrates the steps of a method of lateral measurement of a work according to some embodiments.
Figure 6:
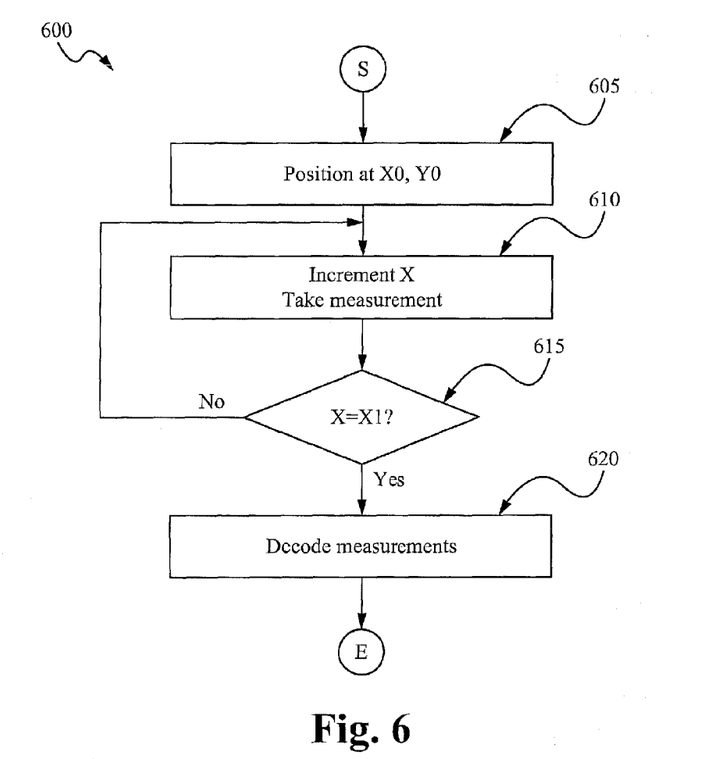
FIG. 6 illustrates the steps of a method of identifying a work for performing a lateral measurement according to some embodiments.

FIG. 5 illustrates the steps of a method 500 of lateral measurement of a work according to some embodiments. The method begins at step 505 wherein the Part ID is determined for the type of part to be measured. The Part ID can be manually entered into the lateral measurement system or scanned at the Part ID area 190 by the laser scanning system 110. The lateral measurement scan begins at a first position of the laser scanner system, $X_0, Y_0$. At step 510, the laser scanning system position is incremented in the Y direction and a measurement is taken as described above in FIG. 4B. At step 515, if the Y-coordinate of the laser scanner system is equal to $Y_1$, then the measurement scan in the Y direction for the reflected edge having X-coordinate equal to $X_0$ stops, and the method proceeds to step 520. Otherwise, the method returns to step 510. At step 520, the position of the laser scanning system, initially at $X_0, Y_1$, is incremented in the X direction and a measurement is taken. At step 525, if the X-coordinate of the laser scanner system is equal to $X_1$, then the measurement scan for the reflective edge having Y-coordinate equal to $Y_1$ stops, and the method proceeds to step 530. Otherwise, the method returns to step 520. At step 530, the position of the laser scanning system, initially at $X_1, Y_1$, is decremented in the Y direction, and a measurement is taken. At step 535, if the Y-coordinate of the laser scanning system position is equal to $Y_0$, the measurement scan for the reflective edge having X-coordinate equal to $X_1$ stops and the method proceeds to Step 540. Otherwise, the method returns to step 530. At step 540, the laser scanner position, initially $X_1, Y_0$, is decremented in the X direction and a measurement is taken. At step 545, if the X-coordinate of the laser scanner system position is equal to $X_0$ then the measurement scan for the reflective edge having Y-coordinate equal to $Y_0$ stops, and the method 500 ends. Otherwise the method returns to step 540.

As one example, the laser scan is moved in a pre-determined pattern, such that it traverses the entire periphery of a work at discrete offsets. In other embodiments, the laser scan may traverse less than the entire periphery of a work, scanning a sufficient number of points such that an accurate measurement of the work can still be made.

FIG. 6 illustrates the steps of a method 600 of identifying a work for performing a lateral measurement according to some embodiments. As shown in FIG. 4B, the Part ID area 190 is located on a reflective edge of the work 150. At step 605, initially the laser scanner system is positioned at $X_0, Y_0$. The Part ID location ends at $X_1, Y_0$. At step 610, the X-coordinate of the laser scanning system is incremented and a measurement is taken. The measurement is translated into a coordinate as described above. At step 615, if the X-coordinate of the laser scanner is equal to $X_1$, then the method proceeds to step 620. Otherwise the method returns to step 610. At step 620, the coordinates of the Part ID are decoded. Decoding the Part ID from the coordinates is discussed below.

System Integration

The lateral measurement process described herein is a pre-processing step in a machining process of a work. Accordingly, the lateral measurement system can be integrated into an existing CNC machine. In such an integration, the laser scanning system is interfaced to a processor in the CNC machine such that the coordinates of the work generated by the laser scanning system are passed as data to the CNC machine. The CNC machine is already programmed to process the work and thus the CNC machine contains data that describes the work before and during machining The coordinates generated by the laser scanning system can be compared to the design data for the work stored in the CNC machine. To facilitate such as comparison, the CNC data can be referenced to a Part ID. The work to be machined, and its lateral measurements, can also be referenced by the Part ID.

Decoding the Part ID

The Part ID as described herein is an identifier for a particular class of work 150. The Part ID relates a particular type or shape of work 150 to the CNC instructions that will process all work pieces 150 of that particular type or shape. The Part ID can be entered manually into the CNC machine before the lateral measurement process is performed. Alternatively, the Part ID can be scanned from a sticker or machining on the work 150 itself. The laser scanning system 110 detects the presence and absence of reflection and computes the distance from the laser system to a point of reflection on the work 150, if reflection is present. Accordingly, the laser scanning system can detect both the depth and the width of a machining on the reflective edge 135 of the work 150. A Part ID can then be constructed from machinings in the Part ID area 190 on the work 150 of varying depth, width, and/or reflectivity. The scanned pattern of depth, width, and/or reflectivity is passed to the CNC machine and translated into a Part ID in accordance with patterns stored in the CNC machine.

Non-reflective Portions of the Work

As described above in FIGS. 3A and 3B, a work 150 need not comprise only orthogonally reflective edges. A curved edge or an offset in an otherwise reflective edge can be detected by the detector 115 not receiving a reflected beam 165 in response to the laser scanning system 110 emitting a beam 160 during a measurement. Non-reflective regions are stored as invalid coordinates. An invalid coordinate is, for example, a negative coordinate, a coordinate so large as to be obviously invalid, or another logically invalid coordinate value. Coordinates of these non-reflective regions can then be compared against a set of ideal coordinates within the CNC machine to determine whether the work 150 conforms to the ideal coordinates. If the deviation of the measured coordinates from the ideal coordinates is greater than a threshold amount, such that a logical inference can be made that the work 150 has the wrong Part ID, then an appropriate notification can be issued to an operator of the lateral measurement/CNC system before the machining process of the CNC machine is initiated. Such comparison can identify poor manufacturing of work 150 and can also identify an improper Part ID on a work 150. In both cases, there is less scrap generated by comparing the lateral measurement coordinates to the ideal coordinates in the CNC machine before machining the work.

Enhancing Scanning Efficiency

As described above, the lateral measurement system can be integrated with a CNC machine. The CNC machine contains machining instructions for the work 150. The machining instructions can be referenced by the Part ID of the work. By integrating the laser measurement process into the CNC machine, the ideal coordinates for a work 150 can be pre-processed to determined where the non-reflective area(s) of each reflective edge 135 of a work 150 are located. Then, the lateral measurement process described herein can be modified to skip over these non-reflective areas, thereby enhancing the speed of the lateral measurement by not wasting time scanning non-reflective portions of reflective edges.

In operation, a work is placed on a platen and secured to the platen. The work is typically substantially rectangular with reflective edges. A laser scanner measures the coordinates of the reflective edges for the entire periphery of the work and stores the coordinates. The increment between each laser measurement on a reflective edge can be varied to achieve a balance between speed of scanning and quantity of data points gathered. The lateral measurement coordinates are stored and passed to the CNC machine prior to a machining process by the CNC machine.

Specific embodiments have been described to illustrate features of the presently claimed invention. It will be readily apparent to one skilled in the art that modifications may be made to the embodiments without departing from the spirit and scope of the invention as defined by the appended claims.

What is claimed is:

1. A method of performing a lateral measurement of a work having a plurality of reflective edges, the work in a fixed position relative to a machine comprising a laser scanner coupled to an XYZ translation stage, the method comprising, for each predetermined number of points of reflection:
   a. positioning, by the XYZ translation stage, the laser scanner to a XYZ coordinate relative to the work;
   b. measuring, by the laser scanner, a distance from the laser scanner to a point of reflection on one of the plurality of reflective edges of the work, using a beam emitted by the laser scanner;
   c. determining an XY coordinate of the point of reflection; and
   d. incrementing the XYZ coordinate by a value in one of X direction and Y direction.

2. The method of claim 1, wherein performing a lateral measurement comprises determining an XY coordinate of a point of reflection at a plurality of points on each of the plurality of reflective edges.

3. The method of claim 2, wherein the work is substantially rectangular and the work is oriented substantially in alignment with the XY plane of the XYZ translation stage, and repositioning the laser scanner comprises incrementing a position of the laser scanner along one of the X and Y axes.

4. The method of claim 2, further comprising storing the XY coordinate.

5. The method of claim 4, wherein when no reflection is received in response to the beam emitted by the laser scanner, the resulting coordinate is stored as an invalid coordinate.

6. The method of claim 5, further comprising determining an identifier for the work.

7. The method of claim 6, wherein determining an identifier for the work comprises scanning the identifier using the laser scanner.

8. The method of claim 6, further comprising retrieving a predetermined set of ideal coordinates associated with the identifier.

9. The method of claim 8, further comprising comparing the stored coordinates to the predetermined set of ideal coordinates.

10. The method of claim 9, wherein the machine further comprises a notification system, and the method further comprises issuing a notification that one of: the stored coordinates substantially match and do not substantially match, the predetermined set of ideal coordinates.

11. A system for performing a lateral measurement of a work having a plurality of reflective edges, comprising:
   a. an XYZ translation stage;
   b. a laser scanner coupled to the XYZ translation stage;
   c. a platen configured to receive the work in a fixed position relative to the XYZ translation stage;
   d. a controller configured to, for each predetermined number of points of reflection:
      i. position the XYZ translation stage at a XYZ coordinate relative to the work;
      ii. control the laser scanner to measure the distance to a point of reflection on one of the plurality of reflective edges of the work, using a beam emitted by the laser scanner;
      iii. determine an XY coordinate of the point of reflection; and
      iv. increment the XYZ coordinate by a value in one of X direction and Y direction.

12. The system of claim 11, wherein the platen comprises a plurality of reflectors configured to reflect the beam onto a point on each of the plurality of reflective edges of the work.

13. The system of claim 11, wherein the laser scanner comprises a reflector configured to reflect the beam onto a point on a reflective edge of the work.

14. The system of claim 13, wherein the XYZ translation stage is configured to rotate the laser scanner in a Z axis, perpendicular to a top surface of the platen.

15. The system of claim 13, wherein the controller is configured to reposition the XYZ translation stage to a second predetermined XYZ coordinate that is on a line through the first predetermined XYZ coordinate and parallel to one of the plurality of the reflective edges.

16. The system of claim 12, wherein the controller is configured to reposition the XYZ translation stage to a second predetermined XYZ coordinate that is on a line defined by an axis of one of the plurality of reflectors.

17. A non-transitory computer readable medium programmed with processor-executable instructions that, when executed, perform a method of performing a lateral measurement of a work having a plurality of reflective edges, the work in a fixed position relative to a machine comprising a laser scanner coupled to an XYZ translation stage, the method comprising, for each predetermined number of points of reflection:
   a. positioning, by the XYZ translation stage, the laser scanner to a XYZ coordinate relative to the work;
   b. measuring, by the laser scanner, a distance from the laser scanner to a point of reflection on one of the plurality of reflective edges of the work, using a beam emitted by the laser scanner;
   c. determining an XY coordinate of the point of reflection; and d. incrementing the XYZ coordinate by a value in one of X direction and Y direction.

* * * * *